3,110,689
ORGANOSILOXANE COMPOSITIONS CURABLE TO ELASTOMERS AT ROOM TEMPERATURE

Frederick A. Smith, Kenmore, N.Y., assignor to Union Carbide Corporation, a corporation of New York
No Drawing. Filed Dec. 28, 1960, Ser. No. 78,838
16 Claims. (Cl. 260—18)

This invention relates to room temperature curable organosiloxane compositions. More particularly, this invention relates to compositions containing hydroxy endblocked organosiloxane fluids and a polyvinylalkoxysilane and to the elastomers produced therefrom.

The present invention is based, in part, upon the discovery that compositions comprising (1) a hydroxy endblock diorganopolysiloxane fluid, (2) a polyvinylalkoxysilane and the partial hydrolyzates thereof and (3) as a catalyst a metal salt of a carboxylic acid; are curable to organosiloxane elastomers at room temperature. The compositions can also contain a filler if desired.

The hydroxy end-blocked diorganopolysiloxane fluids which can be employed in the compositions of this invention are comprised of essentially linear polymeric chains composed of units of the formula:

and which have hydroxy groups bonded to each of the terminal silicon atoms of each chain. In the above formula, R and R' represent organic radicals, as for example, monovalent hydrocarbon groups such as alkyl, aryl, alkaryl, aralkyl, cycloalkenyl, and alkenyl groups including methyl, ethyl, propyl, butyl, phenyl, phenylethyl, naphthyl, cyclopentyl, cyclohexyl, vinyl, allyl, cyclohexenyl and the like; and carbon-functional groups which are substituted hydrocarbon groups bonded to the silicon atom through a carbon to silicon linkage and in which groups the carbon-functional substituent is removed by at least two carbon atoms of a saturated hydrocarbon chain from silicon. Typical of such carbon-functional groups are: beta-cyanoethyl, gamma-cyanopropyl, cyanophenyl, gamma-nitropropyl, nitrophenyl, chlorophenyl, difluorophenyl, the fluorinated alkyl groups such as gamma,gamma,gamma-trifluoropropyl and the like.

The hydroxy end-blocked organopolysiloxane fluids are further characterized by viscosities at 25° C. of from about 100 centipoises up to about 2,000,000 centipoises and preferably in the range of from about 1,000 to about 50,000 c.p.s. For the most part, such organopolysiloxanes will vary from pourable liquids to viscous fluids which will slowly flow when poured. Such organopolysiloxanes are further characterized by an organic group to silicon atom ratio of from about 1.95:1 to 2:1 and contain one hydroxy group bonded to each of the terminal silicon atoms of the polymer chains.

The polyvinylalkoxysilanes suitable for use in the present invention are those of the formula:

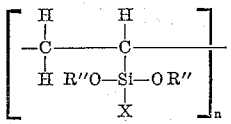

and the partial hydrolyzates thereof; wherein R" represents an alkyl group, as for example methyl, ethyl, propyl, hexyl and the like; (n) is an integer having a value of at least 2 and preferably (n) has a value of from 2 to 1000, X is a member of the class consisting of alkyl, aryl and alkoxy groups and preferably X is an alkoxy group.

Illustrative of the alkyl groups that X represents are methyl, ethyl, propyl, butyl, octyl and the like. Illustrative of the aryl groups that X represents are phenyl, tolyl, xylyl and the like. Illustrative of the alkoxy groups that X represents are methoxy, ethoxy, propoxy, hexoxy and the like.

The metal salts of carboxylic acids which can be employed as the catalyst in preparing the room temperature-curable compositions of the present invention include the carboxylic acid salts of lead, tin zirconium, iron, cadmium, titanium, calcium and manganese. It is preferred that the carboxylic acid salts of the above metals be characterized by the property that the carboxylic acid radical contains less than 14 carbon atoms, and preferably from 3 to 14 carbon atoms. While the metal salts of acetic acid can be employed, it has been found that the acetic acid salts cause a rapid curing of the composition to elastomers so as to make such a system difficult to handle. While the metal salts containing more than 14 carbon atoms are operable to cure the compositions to elastomers, it has been found that such salts leave an oily residue in the elastomers thereby making the elastomer feel greasy to the touch.

It is preferred that the salt be soluble in the hydroxy end-blocked diorganopolysiloxane fluid although insoluble salts can be employed if they are properly dispersed in the system. Typical of the metal salts of carboxylic acids which are operative are the naphthenates, propionates, butyrates, hexoates, oleates, benzoates, laurates, linoleates, stearates and octoates of the above metals.

While a filler is not necessary to form the room temperature-curing compositions of this invention, a filler can be employed, if desired, to give higher tensile strengths to the elastomers produced.

The fillers which can be employed in the composition of this invention are any of those commonly employed in the art and include, for example, titanium dioxide, silica, of the fumed or precipitated type, calcium carbonate, diatomaceous earth, silica aerogel, carbon black and the like. When employing carbon black as the filler, it is usually employed in combination with other fillers and is preferably not present in amounts more than 50% by weight of the total fillers present. It is preferred that at least 50% by weight of the total filler constitute a finely divided silica.

The amount of such filler when employed in the composition of this invention can be from 10 to 200 parts by weight per 100 parts by weight of the hydroxy endblocked diorganopolysiloxane fluid. It is preferred to employ the filler in amounts of from 20 to 60 parts by weight filler per 100 parts by weight of the diorganosiloxane fluid.

The amount of the polyvinylalkoxysilane employed in the compositions of this invention can range from 0.1 to 10 parts by weight of the polyvinylalkoxysilane per 100 parts by weight of the diorganopolysiloxane fluid. It is preferred that said polyvinylalkoxysilane be employed in amounts of from 2 to 5 parts by weight per 100 parts by weight of the fluid.

The metal salt of the carboxylic acid, which is employed as the catalyst for the room temperature curable compositions of the invention can be employed in amounts of from 0.5 to 5.0 parts by weight per 100 parts by weight of the diorganopolysiloxane fluid. It is preferred that such catalyst be employed in amounts of from 1 to 2 parts by weight per 100 parts by weight of the diorganopolysiloxane fluid.

The hydroxy end-block diorganopolysiloxane can be prepared by the steps of hydrolyzing or cohydrolyzing one or more monomeric silanes containing two silicon bonded hydrolyzable groups and treating the resulting hydrolyzate to prepare pure polymers in the form of cyclic siloxanes which are then subjected to equilibration (polymerization) procedures to yield essentially linear polymer of high molecular weight. Such polymers are then reacted with limited amounts of water and at elevated temperatures for varying periods of time to produce the desired starting hydroxy end-blocked diorganopolysiloxane.

The polyvinylalkoxysilanes suitable for use in the compositions of this invention can be prepared by the polymerization of a vinylalkoxysilane in the presence of a free radical producing catalyst such as ditertiarybutyl peroxide. For example, the following procedure can be employed to produce a polyvinyltriethoxysilane: vinyltriethoxysilane (100 grams) is charged into a reaction flask and ditertiarybutyl peroxide (0.5 gram) added. The reaction flask and mixture are heated to 135° C. for 6 hours with stirring, while maintaining an inert atmosphere of nitrogen or argon over the mixture. A polyvinyltriethoxysilane having a viscosity of about 8,000 centipoises at room temperature is produced.

Preparation of the room temperature curing composition is accomplished by simply thoroughly admixing the ingredients and permitting curing to take place. In most instances it will be preferred to add the metal salt of the carboxylic acid last to prevent premature curing of the compositions.

The room temperature curing compositions of the present invention employing polyvinylalkoxysilane and the partial hydrolyzates thereof are characterized by desirable improved elongation and compressive strength properties. While the exact mechanism by which such improvement is not fully known or understood it is postulated that the increased length of the crosslinking unit of the polyvinylalkoxysilane compound provides a more flexible crosslinking unit as compared to the crosslinking units present when silicates are employed for this same purpose.

The room-temperature curable compositions of this invention are useful in the production of organosiloxane elastomers at room temperature. The composition of the invention are particularly useful in sealing, puttying and caulking applications.

The following examples serve to illustrate the invention, all parts are by weight unless otherwise specified.

*Example 1*

A description of the preparation of a hydroxy end-blocked diorganopolysiloxane fluid:

Hexamethylcyclotrisiloxane (100 parts), water (45 parts), and ammonia (100 parts) are charged to an autoclave and heated to 150° C. for several hours. A dimethylpolysiloxane having a hydroxyl group bonded to each of the terminal silicon atoms thereof was obtained in about 75% yield. This dimethylpolysiloxane had a viscosity at room-temperature of 50 centipoises, contained 3% by weight hydroxy groups and contained an average of from 14 to 16 [(CH₃)₂SiO] units per chain.

Approximately one gallon of the above material was mixed with 10 grams of calcium zeolite X, a synthetic zeolite, and heated to 150° C. for 35 hours to cause the material to condense and form a dimethylpolysiloxane fluid having a hydroxyl group bonded to each of the terminal silicon atoms thereof and having a higher viscosity. After cooling to room temperature, the calcium zeolite X was removed by filtration to yield a dimethylpolysiloxane fluid of 20,000 centipoises viscosity at room temperature and haivng a hydroxyl group bonded to each terminal silicon atom thereof.

*Example 2*

Ten grams of hydroxy end-blocked dimethylpolysiloxane prepared according to the procedure of Example 1 but having a viscosity of 28,000 centistokes at normal room temperature were placed in a small dish and thoroughly mixed with 0.5 gram of a polyvinyltriethoxysilane having a viscosity at room temperature of 8000 centistokes. Tin octoate containing 28% tin (0.2 gram) was then stirred into the mixture. Within thirty minutes at room temperature the mixture changed from a viscous fluid to a tough, springy, resilient, rubbery elastomer. The material had permanently taken the shape of the dish in which it had been allowed to cure, and when stretched or deformed and released it immediately returned to its cured shape.

*Example 3*

When ten grams of the following mixture are placed in a glass vessel:

100 grams of hydroxy end-blocked dimethylpolysiloxane, 36,000 cstks.

35 grams of Celite Superfloss, a finely divided diatomaceous silica.

2 grams of Titanox RA–50, a finely divided titanium dioxide.

Then, 0.5 gram of a polyvinyltriethoxysilane is added and the ingredients are thoroughly mixed. Tin octoate containing 28% tin (0.2 gram) is then added and thoroughly mixed. A tough rubbery solid elastomer of excellent resilience is obtained within 15 minutes at room temperature.

What is claimed is:

1. A composition of matter curable to an elastomer at room temperature which comprises (1) 100 parts by weight of a diorganopolysiloxane fluid having a hydroxy group bonded to each of the terminal silicon atoms thereof, said fluid being an essentially linear diorganopolysiloxane composed of units of the formula

wherein R and R' are monovalent organic radicals selected from the class consisting of monovalent hydrocarbon groups and monovalent carbon-functional substituted hydrocarbon groups, said substituted hydrocarbon group being bonded to the silicon atom through a carbon to silicon linkage and wherein the carbon-functional substituent is removed by at least two carbon atoms of a saturated hydrocarbon chain from the silicon atom, said fluid having a viscosity of from 100 centipoises to 2,000,000 centipoises at room temperature and having an organic group to silicon atom ratio of from about 1.95:1 to 2:1 (2) from 0.1 to 10 parts by weight of a polyvinylalkoxysilane selected from the class consisting of compounds of the formula

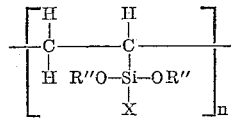

and the partial hydrolyzates thereof, wherein R'' is an alkyl group, X is a member of the class consisting of alkyl, aryl and alkoxy groups, and (n) is an integer of at least 2, (3) from 0.5 to 5 parts by weight of a metal salt of a carboxylic acid wherein the metal is selected from the class consisting of lead, tin, zirconium, iron, cadmium, titanium, calcium and manganese.

2. A composition of matter curable to an elastomer at room temperature which comprises (1) 100 parts by weight of a diorganopolysiloxane fluid having a hydroxy group bonded to each of the terminal silicon atoms thereof, said fluid being an essentially linear diorganopolysiloxane composed of units of the formula

wherein R and R' are monovalent organic radicals selected from the class consisting of monovalent hydrocarbon groups and monovalent carbon-functional substituted hydrocarbon groups, said substituted hydrocarbon group being bonded to the silicon atom through a carbon to silicon linkage and wherein the carbon-functional substituent is removed by at least two carbon atoms of a saturated hydrocarbon chain from the silicon atom, said fluid having a viscosity of from 1,000 centipoises to 50,000 centipoises at room temperature and having an organic group to silicon atom ratio of from about 1.95:1 to 2:1 (2) from 2 to 5 parts by weight of a polyvinylalkoxysilane selected from the class consisting of compounds of the formula

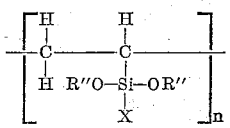

and the partial hydrolyzates thereof, wherein R'' is an alkyl group, X is a member of the class consisting of alkyl, argyl and alkoxy groups, and ($n$) is an integer of at least 2, (3) from 1 to 2 parts by weight of a metal salt of a carboxylic acid wherein the metal is selected from the class consisting of lead, tin, zirconium, iron, cadmium, titanium, calcium and manganese.

3. A composition of matter curable to an elastomer at room temperature which comprises (1) 100 parts by weight of a dimethylpolysiloxane fluid having a hydroxy group bonded to each of the terminal silicon atoms thereof, said fluid being an essentially linear dimethylpolysiloxane composed of units of the formula

said fluid having a viscosity of from 1,000 centipoises to 50,000 centipoises at room temperature and having a methyl group to silicon atom ratio of from about 1.95:1 to 2:1, (2) from 2 to 5 parts by weight of a polyvinyltriethoxysilane of the formula

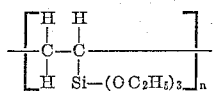

and the partial hydrolyzates thereof, wherein ($n$) is an integer of at least 2, and (3) from 0.5 to 5 parts by weight of a metal salt of a carboxylic acid wherein the metal is selected from the class consisting of lead, tin, zirconium, iron, cadmium, titanium, calcium and manganese.

4. A composition of matter as claimed in claim 1, wherein the carboxylic acid contains from 3 to 14 carbon atoms inclusive.

5. A composition of matter curable to an elastomer at room temperature which comprises (1) 100 parts by weight of a diorganopolysiloxane fluid having a hydroxy group bonded to each of the terminal silicon atoms thereof, said fluid being an essentially linear diorganopolysiloxane composed of units of the formula

wherein R and R' are monovalent organic radicals selected from the class consisting of monovalent hydrocarbon groups and monovalent carbon-functional substituted hydrocarbon groups, said substituted hydrocarbon group being bonded to the silicon atom through a carbon to silicon linkage and wherein the carbon-functional substituent is removed by at least two carbon atoms of a saturated hydrocarbon chain from the silicon atom, said fluid having a viscosity of from 100 centipoises to 2,000,000 centipoises at room temperature and having an organic group to silicon atom ratio of from about 1.95:1 to 2:1 (2) from 0.1 to 10 parts by weight of a polyvinylalkoxysilane selected from the class consisting of compounds of the formula

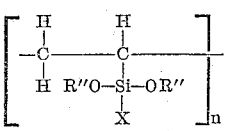

and the partial hydrolyzates thereof, wherein R'' is an alkyl group, X is a member of the class consisting of alkyl, aryl and alkoxy groups, and ($n$) is an integer of at least 2, (3) from 10 to 200 parts by weight of a filler, and (4) from 0.5 to 5 parts by weight of a metal salt of a carboxylic acid wherein the metal is selected from the class consisting of lead, tin, zirconium, iron, cadmium, titanium, calcium and manganese.

6. A composition of matter curable to an elastomer at room temperature which comprises (1) 100 parts by weight of a diorganopolysiloxane fluid having a hydroxy group bonded to each of the terminal silicon atoms thereof, said fluid being an essentially linear diorganopolysiloxane composed of units of the formula

wherein R and R' are monovalent organic radicals selected from the class consisting of monovalent hydrocarbon groups and monovalent carbon-functional substituted hydrocarbon groups, said substituted hydrocarbon group being bonded to the silicon atom through a carbon to silicon linkage and wherein the carbon-functional substituent is removed by at least two carbon atoms of a saturated hydrocarbon chain from the silicon atom, said fluid having a viscosity of from 1,000 centipoises to 50,000 centipoises at room temperature and having an organic group to silicon atom ratio of from about 1.95:1 to 2:1, (2) from 2 to 5 parts by weight of a polyvinylalkoxysilane selected from the class consisting of compounds of the formula

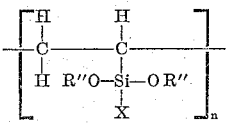

and the partial hydrolyzates thereof, wherein R'' is an alkyl group, X is a member of the class consisting of alkyl, aryl and alkoxy groups, and ($n$) is an integer of at least 2, (3) from 20 to 60 parts by weight of a filler, and (4) from 1 to 2 parts by weight of a metal salt of a carboxylic acid wherein the metal is selected from the class consisting of lead, tin, zirconium, iron, cadmium, titanium, calcium and manganese.

7. A composition of matter curable to an elastomer at room temperature which comprises (1) 100 parts by weight of a dimethylpolysiloxane fluid having a hydroxy group bonded to each of the terminal silicon atoms thereof, said fluid being an essentially linear dimethylpolysiloxane composed of units of the formula

said fluid having a viscosity of from 1,000 centipoises to 50,000 centipoises at room temperature and having a methyl group to silicon atom ratio of from about 1.95:1 to 2:1, (2) from 2 to 5 parts by weight of a polyvinyltriethoxysilane of the formula

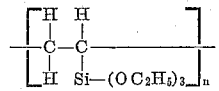

and the partial hydrolyzates thereof, wherein ($n$) is an integer of at least 2, (3) from 20 to 60 parts by weight of a filler, and (4) from 0.5 to 5 parts by weight of a metal salt of a carboxylic acid wherein the metal is selected from the class consisting of lead, tin, zirconium, iron, cadmium, titanium, calcium and manganese.

8. A composition of matter as claimed in claim 5, wherein the carboxylic acid contains from 3 to 14 carbon atoms inclusive.

9. A composition of matter of an organosiloxane elastomer comprising a room temperature-cured mixture consisting essentially of (1) 100 parts by weight of a diorganopolysiloxane fluid having a hydroxy group bonded to each of the terminal silicon atoms thereof, said fluid being an essentially linear diorganopolysiloxane composed of units of the formula

wherein R and R' are monovalent organic radicals selected from the class consisting of monovalent hydrocarbon groups and monovalent carbon-functional substituted hydrocarbon groups, said substituted hydrocarbon group being bonded to the silicon atom through a carbon to silicon linkage and wherein the carbon-functional substituent is removed by at least two carbon atoms of a saturated hydrocarbon chain from the silicon atom, said fluid having a viscosity of from 100 centipoises to 2,000,000 centipoises at room temperature and having an organic group to silicon atom ratio of from about 1.95:1 to 2:1, (2) from 0.1 to 10 parts by weight of polyvinylalkoxysilane selected from the class consisting of compounds of the formula

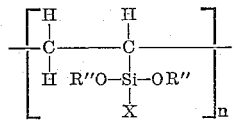

and the partial hydrolyzates thereof, wherein R″ is an alkyl group, X is a member of the class consisting of alkyl, aryl and alkoxy groups, and (n) is an integer of at least 2, (3) from 0.5 to 5 parts by weight of a metal salt of a carboxylic acid wherein the metal is selected from the class consisting of lead, tin, zirconium, iron, cadmium, titanium, calcium and manganese.

10. A composition of matter of an organosiloxane elastomer comprising a room temperature-cured mixture consisting essentially of (1) 100 parts by weight of a diorganopolysiloxane fluid having a hydroxy group bonded to each of the terminal silicon atoms thereof, said fluid being an essentially linear diorganopolysiloxane composed of units of the formula

wherein R and R' are monovalent organic radicals selected from the class consisting of monovalent hydrocarbon groups and monovalent carbon-functional substituted hydrocarbon groups, said substituted hydrocarbon group being bonded to the silicon atom through a carbon to silicon linkage and wherein the carbon-functional substituent is removed by at least two carbon atoms of a saturated hydrocarbon chain from the silicon atom, said fluid having a viscosity of from 1,000 centipoises to 50,000 centipoises at room temperature and having an organic group to silicon atom ratio of from about 1.95:1 to 2:1, (2) from 2 to 5 parts by weight of a polyvinylalkoxysilane selected from the class consisting of compounds of the formula

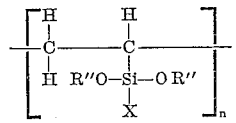

and the partial hydrolyzates thereof, wherein R″ is an alkyl group, X is a member of the class consisting of alkyl, aryl and alkoxy groups, and (n) is an integer of at least 2, (3) from 1 to 2 parts by weight of a metal salt of a carboxylic acid wherein the metal is selected from the class consisting of lead, tin, zirconium, iron, cadmium, titanium, calcium and manganese.

11. A composition of matter of an organosiloxane elastomer comprising a room temperature-cured mixture consisting essentially of (1) 100 parts by weight of a dimethylpolysiloxane fluid having a hydroxy group bonded to each of the terminal silicon atoms thereof, said fluid being an essentially linear dimethylpolysiloxane composed of units of the formula

said fluid having a viscosity of from 1,000 centipoises to 50,000 centipoises at room temperature and having a methyl group to silicon atom ratio of from about 1.95:1 to 2:1, (2) from 2 to 5 parts by weight of a polyvinyltriethoxysilane of the formula

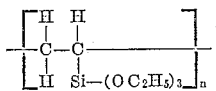

and the partial hydrolyzates thereof, wherein (n) is an integer of at least 2, and (3) from 0.5 to 5 parts by weight of a metal salt of a carboxylic acid wherein the metal is selected from the class consisting of lead, tin, zirconium, iron, cadmium, titanium, calcium and manganese.

12. A composition of matter as claimed in claim 9, wherein the carboxylic acid contains from 3 to 14 carbon atoms inclusive.

13. A composition of matter of an organosiloxane elastomer comprising a room temperature-cured mixture consisting essentially of (1) 100 parts by weight of a diorganopolysiloxane fluid having a hydroxy group bonded to each of the terminal silicon atoms thereof, said fluid being an essentially linear diorganopolysiloxane composed of units of the formula

wherein R and R' are monovalent organic radicals selected from the class consisting of monovalent hydrocarbon groups and monovalent carbon-functional substituted hydrocarbon groups, said substituted hydrocarbon group being bonded to the silicon atom through a carbon to silicon linkage and wherein the carbon-functional substituent is removed by at least two carbon atoms of a saturated hydrocarbon chain from the silicon atom, said fluid having a viscosity of from 100 centipoises to 2,000,000 centipoises at room temperature and having an organic group to silicon atom ratio of from about 1.95:1 to 2:1, (2) from 0.1 to 10 parts by weight of polyvinylalkoxysilane selected from the class consisting of compounds of the formula

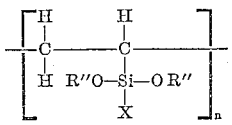

and the partial hydrolyzates thereof, wherein R″ is an alkyl group, X is a member of the class consisting of alkyl, aryl and alkoxy groups, and (n) is an integer of at least 2, (3) from 10 to 200 parts by weight of a filler, and (4) from 0.5 to 5 parts by weight of a metal salt of a carboxylic acid wherein the metal is selected from the class consisting of lead, tin, zirconium, iron, cadmium, titanium, calcium and manganese.

14. A composition of matter of an organosiloxane elastomer comprising a room temperature-cured mixture consisting essentially of (1) 100 parts by weight of a diorganopolysiloxane fluid having a hydroxy group bonded to each of the terminal silicon atoms thereof, said fluid being an essentially linear diorganopolysiloxane composed of units of the formula

wherein R and R' are monovalent organic radicals selected from the class consisting of monovalent hydrocarbon groups and monovalent carbon-functional substituted hydrocarbon groups, said substituted hydrocarbon group being bonded to the silicon atom through a carbon to silicon linkage and wherein the carbon-functional substituent is removed by at least two carbon atoms of a saturated hydrocarbon chain from the silicon atom, said fluid having a viscosity of from 1,000 centipoises to 50,000 centipoises at room temperature and having an organic group to silicon atom ratio of from about 1.95:1 to 2:1, (2) from 2 to 5 parts by weight of a polyvinylalkoxysilane selected from the class consisting of compounds of the formula

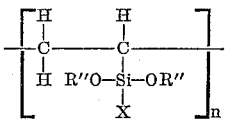

and the partial hydrolyzates thereof, wherein R'' is an alkyl group, X is a member of the class consisting of alkyl, aryl and alkoxy groups, and ($n$) is an integer of at least 2, (3) from 20 to 60 parts by weight of a filler, and (4) from 1 to 2 parts by weight of a metal salt of a carboxylic acid wherein the metal is selected from the class consisting of lead, tin, zirconium, iron, cadmium, titanium, calcium and manganese.

15. A composition of matter of an organosiloxane elastomer comprising a room temperature-cured mixture consisting essentially of (1) 100 parts by weight of a dimethylpolysiloxane fluid having a hydroxy group bonded to each of the terminal silicon atoms thereof, said fluid being an essentially linear dimethylpolysiloxane composed of units of the formula

said fluid having a viscosity of from 1,000 centipoises to 50,000 centipoises at room temperature and having a methyl group to silicon atom ratio of from about 1.95:1 to 2:1, (2) from 2 to 5 parts by weight of a polyvinyltriethoxysilane of the formula

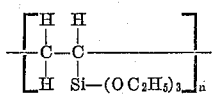

and the partial hydrolyzates thereof, wherein ($n$) is an integer of at least 2, (3) from 20 to 60 parts by weight of a filler, and (4) from 0.5 to 5 parts by weight of a metal salt of a carboxylic acid wherein the metal is selected from the class consisting of lead, tin, zirconium, iron, cadmium, titanium, calcium and manganese.

16. A composition of matter as claimed in claim 13, wherein the carboxylic acid contains from 3 to 14 carbon atoms inclusive.

References Cited in the file of this patent

UNITED STATES PATENTS

| | | |
|---|---|---|
| 2,843,555 | Berridge | July 15, 1958 |
| 2,902,467 | Chipman | Sept. 1, 1959 |
| 2,927,907 | Polmanteer | Mar. 8, 1960 |

FOREIGN PATENTS

| | | |
|---|---|---|
| 216,878 | Australia | Aug. 29, 1958 |